(12) United States Patent
Kato

(10) Patent No.: US 9,216,701 B2
(45) Date of Patent: Dec. 22, 2015

(54) DISPLAY DEVICE

(71) Applicant: Alpine Electronics, Inc., Tokyo (JP)

(72) Inventor: Kazunari Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 111 days.

(21) Appl. No.: 14/268,811

(22) Filed: May 2, 2014

(65) Prior Publication Data

US 2014/0355235 A1 Dec. 4, 2014

(30) Foreign Application Priority Data

May 28, 2013 (JP) ................................ 2013-111588

(51) Int. Cl.
*G06F 1/16* (2006.01)
*B60R 11/02* (2006.01)
*B60R 11/00* (2006.01)

(52) U.S. Cl.
CPC ..... *B60R 11/0235* (2013.01); *B60R 2011/0047* (2013.01)

(58) Field of Classification Search
USPC ........ 165/61, 63, 64, 80.3, 80.2, 122, 104.21,
165/174, 185, 67, 121; 345/8, 206, 89, 105,
345/156, 175, 173, 641; 248/276.1, 176.3,
248/922, 188.5, 125.2, 676, 920; 312/7.2,
312/242, 326, 223.2, 220.21, 223.1, 293.2,
312/215, 222, 223.5, 223.6, 334.1, 348.4,
312/311, 328; 361/679.32, 679.48, 679.02,
361/679.51, 679.33, 679.31, 679.6, 679.08,
361/679.58, 679.47, 679.54, 679.4, 679.55,
361/679.49, 679.37, 679.26, 679.46,
361/679.23, 679.53
See application file for complete search history.

(56) References Cited

U.S. PATENT DOCUMENTS

| 6,583,773 B1 | 6/2003 | Nogami et al. |
| 2007/0170325 A1* | 7/2007 | Ryu ........................ F16M 11/04 248/276.1 |
| 2010/0245277 A1* | 9/2010 | Nakao ................. G06F 3/04886 345/173 |

FOREIGN PATENT DOCUMENTS

| JP | 2001-030848 | 2/2001 |
| JP | 2008-074303 | 4/2008 |

* cited by examiner

*Primary Examiner* — Hung Duong
(74) *Attorney, Agent, or Firm* — Brinks Gilson & Lione

(57) ABSTRACT

A display device includes a display unit having a display screen on a front side, a driving mechanism configured to move the display unit, a holder configured to support the display unit and reciprocally move the display unit relative to the holder in a linear trajectory parallel to the display screen, a rotation guiding mechanism in the driving mechanism configured to rotate the holder, and a movement guiding mechanism in the driving mechanism configured to move the display unit relative to the holder after the holder is rotated to a predetermined position.

14 Claims, 6 Drawing Sheets

DISPLAY DEVICE

PRIORITY CLAIM

This application claims the benefit of Japanese Patent Application No. 2013-111588, filed on May 28, 2013, which is incorporated by reference herein in its entirety.

BACKGROUND

1. Field of the Invention

The present invention relates to display devices for use in a vehicle or the like which include a driving mechanism that moves a display panel from an initial position to an extended position.

2. Description of the Related Art

There are display devices for use in a vehicle which include a display unit configured to move from an initial position in which the display unit is housed in a housing of the display device to an extended position in which the display unit extends outside the housing, or from an initial position in which the display unit is housed inside an instrument panel or a dashboard in the compartment of vehicle to an extended position in which the display unit extends outside the instrument panel or the dashboard.

In some recent display units, an opening which is open upward is formed on a housing or on an instrument panel or a dashboard so that the display unit extends upward through the opening and, when in the extended position, the display unit is located above the opening with a display screen oriented inside the compartment of the vehicle.

In a display device disclosed in Japanese Unexamined Patent Application Publication No. 2008-74303, a display panel is housed in the housing while assuming the horizontal position with a display screen oriented downward in the initial position. Then, the display panel rotates from the initial position with the front end first extending out of the opening. When the entire display panel has been rotated, the display panel assumes the extended position. The display panel in the extended position is located above the opening with the display screen oriented inside the compartment of the vehicle.

In a display device disclosed in Japanese Unexamined Patent Application Publication No. 2001-30848, a display panel is housed with a display screen vertically oriented when the display panel is in the initial position. Then, the display panel moves vertically upward so as to assume the extended position. When the display panel assumes the extended position, an image can be displayed on the display screen.

In the display device disclosed in Japanese Unexamined Patent Application Publication No. 2008-74303, the display panel is housed in a nearly horizontal state in the initial position and rotates in the upwardly-directed opening formed on the housing so as to assume the extended position in which the display panel is in a nearly vertical state. When the display panel passes through the opening, the angle of the display panel significantly changes, and accordingly, the opening area of the opening which allows the display panel to pass through needs to be sufficiently larger than the cross sectional area of the display panel. As a result, a large gap is created between the display panel in the extended position and the inner periphery of the opening, and dirt, dust and foreign matters may easily enter the gap.

Further, in display devices for use in a vehicle, the display screen can be set in a full screen extended position in which the full screen is located outside the opening and in a partial screen extended position in which only part of the screen is located outside the opening so as to accommodate to a variety of displays. In the display device disclosed in Japanese Unexamined Patent Application Publication No. 2008-74303, the display screen can be oriented inside the compartment of the vehicle when the display screen is in the full screen extended position. However, when the display screen is in the partial screen extended position, part of the display screen cannot be seen from the inside of the compartment of the vehicle since the display screen is oriented obliquely downward.

In the display device disclosed in Japanese Unexamined Patent Application Publication No. 2001-30848, the display panel is configured to simply move linearly in the up and down direction and not to rotate. In this display device, the opening area of the upwardly-directed opening formed on the housing or on the instrument panel or the dashboard can be reduced and the display panel can be moved upward while assuming the vertical position to the partial screen extended position.

In the display device disclosed in Japanese Unexamined Patent Application Publication No. 2001-30848, the angular position of the display panel does not change and the display panel is housed in the initial position assuming the vertical position. Accordingly, a vertically long space is necessary in the compartment of the vehicle for positioning the display device. Since various components such as air ducts for the air conditioner and audio components are disposed in the instrument panel or in the dashboard of a vehicle, it may be difficult to allow the display panel to be housed in the vertical position in some types of vehicle.

SUMMARY

Accordingly, it is an object of embodiments of the present invention to provide a display device in which a display panel can be housed in an initial position which is different in angular position from an extended position and in which the display panel is configured to extend upward through an opening having a small opening area by reducing or eliminating a change in angular position of the display panel when the display panel passes through the opening.

It is another object of embodiments of the present invention to provide a display device in which the display panel can be set to a partial screen extended position.

According to an aspect of the present invention, a display device includes a display unit having a screen on a front side; and a driving mechanism that moves the display unit, wherein the display unit is supported to be movable relative to a holder in a linear trajectory parallel to the screen, and the driving mechanism includes a rotation guiding mechanism that rotates the holder and a movement guiding mechanism that moves the display unit relative to the holder after the holder is rotated to a predetermined position.

For example, the holder can be rotated by the rotation guiding mechanism about a first rotation center shaft which is located on the back side of the display unit and extends parallel to the display screen, and the display unit can be moved by the movement guiding mechanism in a linear trajectory which is a tangent to a circular trajectory in which the holder rotates.

In the above aspect of the invention, when the display unit moves from the initial position to the extended position, the holder first rotates, and after that, the display unit moves on the holder in a linear trajectory. Accordingly, change in angular position of the display panel when the display panel passes through the opening can be reduced or almost eliminated. As a result, the display panel can be upwardly extended through the opening having a relatively small opening area.

Further, since the display unit is not configured to simply move in the vertical direction from the initial position to the extended position, the display device can be easily positioned inside the cover member.

In the above aspect of the invention, the display unit in the initial position can be retracted inside the cover member, and when the holder is rotated by the rotation guiding mechanism to stop at a predetermined position, a front end which is oriented in a movement direction of the display unit can face an opening which is formed on the cover member from an inside of the opening or the front end can be located in the opening, and after that, the display unit can be moved by the movement guiding mechanism so as to extend to an outside of the cover member through the opening.

With this configuration, the display unit may be configured to stop in a partial screen extended position in which the display screen partially extends to the outside of the cover member and in a full screen extended position in which the entire display screen extends to the outside of the cover member by the movement guiding mechanism.

Further, the partial screen extended position can be set at a plurality of phases so that different amounts of area of the display screen extend from the cover member at each of the phases.

Further, in the above aspect of the invention, the display unit in the initial position can be retracted inside the cover member, and when the holder is rotated by the rotation guiding mechanism to stop at a predetermined position, the display unit can partially extend to the outside through the opening formed on the cover member, and after that, the display unit can be moved by the movement guiding mechanism so as to extend to the outside of the cover member through the opening.

With this configuration, when the holder is rotated by the rotation guiding mechanism to stop at a predetermined position and the display unit partially extends to the outside through the opening, the partial screen extended position can be set in which the display screen partially extends to the outside of the cover member.

Further, the display unit may be configured to stop in a partial screen extended position in which the display screen partially extends to the outside of the cover member and in a full screen extended position in which the entire display screen extends to the outside of the cover member by the movement guiding mechanism.

Further, the partial screen extended position can be set at a plurality of phases so that different amounts of area of the display screen extend from the cover member at each of the phases.

In the above aspect of the invention, even if the display unit is in the partial screen extended position, the display screen can be easily viewable.

In the above aspect of the invention, the movement guiding mechanism can include a driving arm that rotates about a second rotation drive shaft which extends parallel to the first rotation center shaft, and a distal end of the driving arm can be movably connected relative to the display unit, and after the holder is rotated to stop at a predetermined position, the display unit can be moved relative to the holder by a rotation force of the driving arm.

With this configuration, the rotation force can be applied from a motor to the driving arm, and the holder can be rotated to a predetermined position by the rotation force of the driving arm, and after that, the display unit can be moved relative to the holder by a rotation force of the driving arm.

With this configuration, the display unit can be moved from the initial position to the extended position by using a power source such as a single motor.

In the above aspect of the invention, it is preferable that a stopper mechanism is provided to stop the holder at a predetermined position and the display unit is biased by a spring member to be retracted to the initial position with respect to the holder.

According to the above aspect of the invention, change in angular position of the display panel when the display panel passes through the opening can be reduced or almost eliminated. As a result, the display panel can be upwardly extended through the opening having a relatively small opening area. Further, since the display unit is not configured to simply move in the vertical direction from the initial position to the extended position, there is no need of providing an installation space which is wide in the vertical direction inside the cover member.

Further, the screen can be easily viewable not only in the full screen extended position, but also in the partial screen extended position.

DETAILED DESCRIPTION

Figure 3:
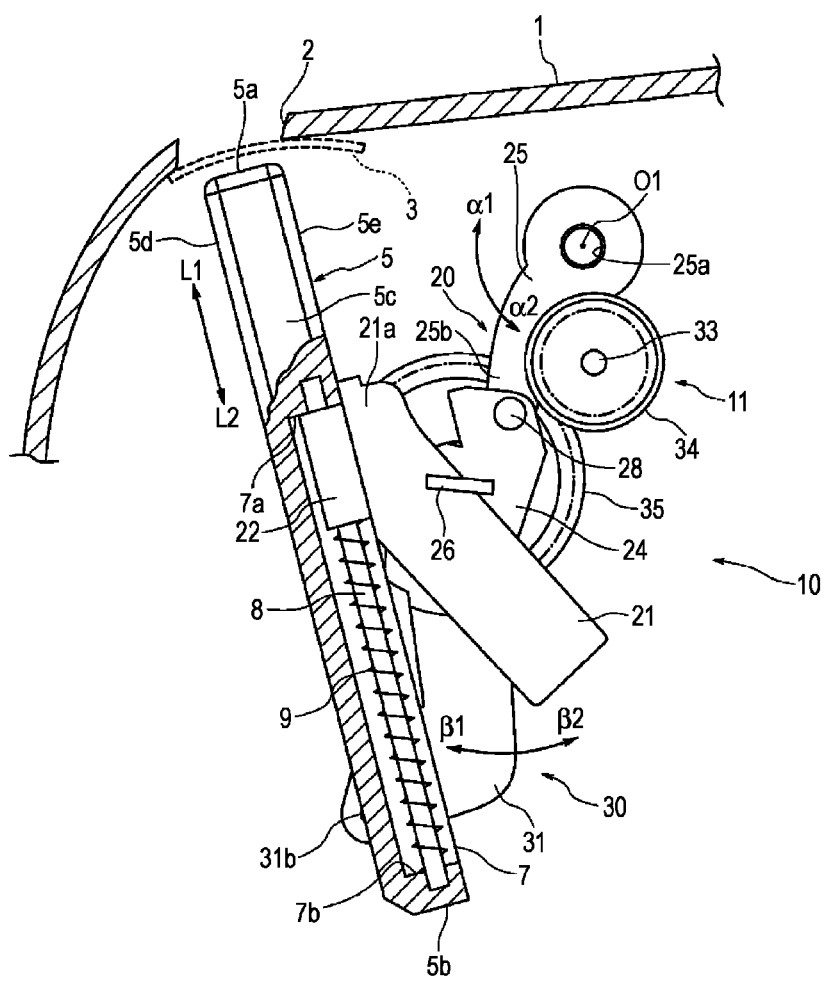
FIG. 3 is a side view which shows the display device and a cover member when the display unit is in an initial position.

As shown in FIG. 3, a display device 10 according to an embodiment of the present invention is disposed inside a cover member 1. The cover member 1 is part of an instrument panel or part of a dashboard in a compartment of a vehicle. Alternatively, the cover member 1 may be part of a housing that houses a main part of the display device 10.

The cover member 1 has an opening 2 that is open upward. A shield member 3 is disposed under the cover member 1 so as to open and close the opening 2. The shield member 3 is configured to open and close the opening 2 by a driving force of a driving mechanism 11 disposed in the display device 10, or by an open and close driving mechanism disposed separately from the display device 10.

Figure 1:
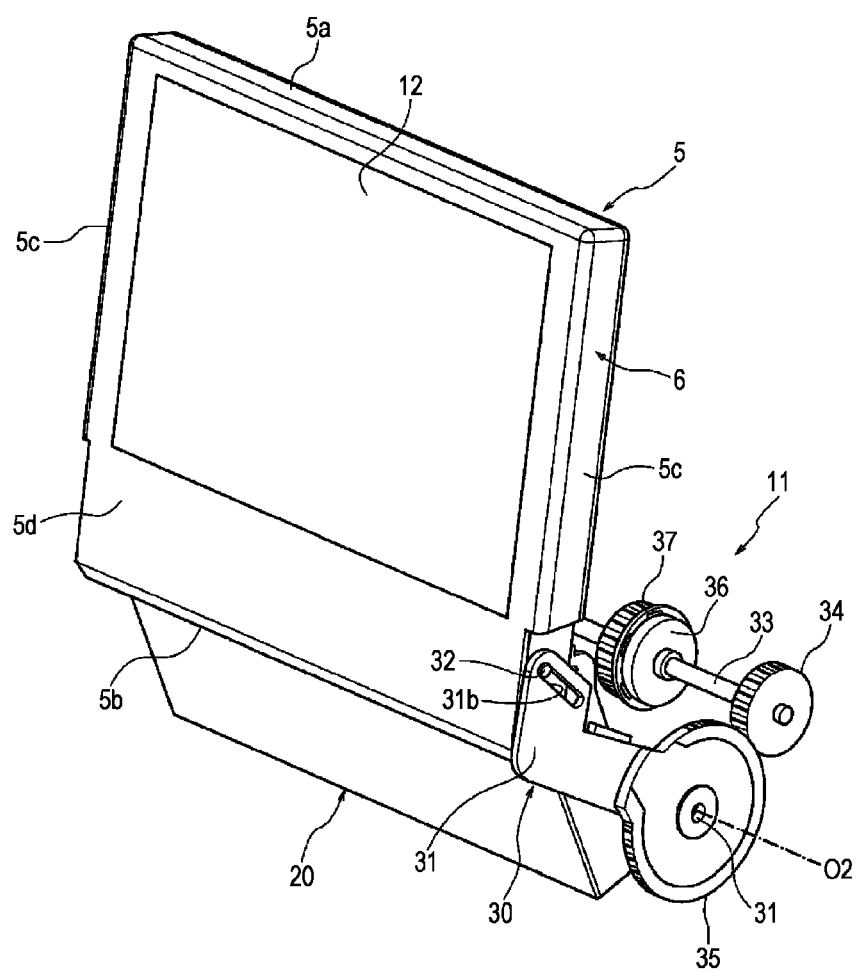
FIG. 1 is a perspective view of a display device according to an embodiment of the present invention as seen from the front side.
Figure 2:
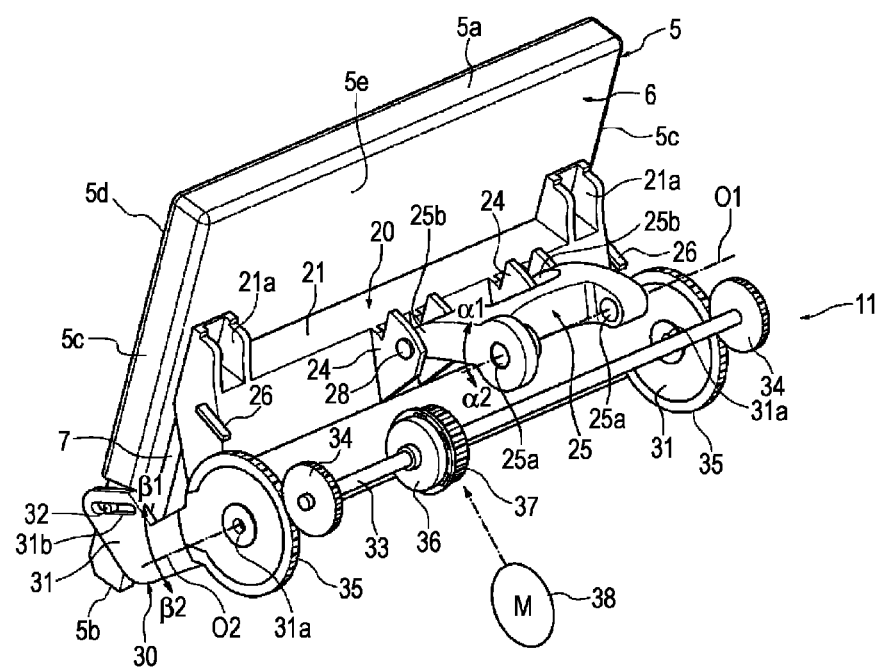
FIG. 2 is a perspective view of the display device according to the embodiment of the present invention as seen from the back side.

As shown in FIGS. 1 and 2, the display device 10 includes a display unit 5. The display unit 5 includes a front end 5a, a back end 5b and right and left side ends 5c, 5c. The display unit 5 further includes a front face 5d and a back face 5e having a wide surface area.

The display unit 5 includes a case 6. A display panel is disposed in the case 6 such that a display screen 12 of the display panel is exposed on the front face 5d of the display unit 5 as shown in FIG. 1. The display panel is a self-emitting type such as a color liquid crystal display panel and an electroluminescence display panel. The display panel may be a type having a touch panel integrally formed on the surface of the display panel so that switching is performed by touching the display screen 12.

As shown in FIG. 2, grooves 7 are formed on both sides of the case 6 on the back face 5e of the display unit 5. As shown in FIG. 3, a movement shaft 8 is housed in each groove 7, and both ends of the movement shaft 8 are fixed inside the case 6. The groove 7 and the movement shaft 8 extend parallel to the side ends 5c of the display unit 5, and thus parallel to the display screen 12.

The display device 10 includes a housing that supports a driving mechanism 11 and the like, although the housing is not shown in the figure.

The driving mechanism 11 includes a rotation guiding mechanism 20 and a movement guiding mechanism 30. The rotation guiding mechanism 20 has a holder 21. As shown in FIG. 2, guide support sections 21a, 21a are formed on each of the both ends of the holder 21. As shown in FIG. 3, a bearing 22 is integrally formed with each guide support section 21a. Alternatively, a bearing 22 formed separately from the holder 21 is fixed on the guide support section 21a. The bearing 22 is fit in the groove 7 of the case 6, and the movement shaft 8 is inserted in the bearing 22 to be movable in a thrust direction.

A pair of movement shafts 8 extends parallel to the display screen 12 which is exposed on the front face 5d of the display unit 5 and also parallel to the side ends 5c. Accordingly, the display unit 5 is supported so as to be movable relative to the holder 21 in a linear trajectory in a L1-L2 direction which is parallel to the display screen 12.

As shown in FIG. 3, a spring member 9 is housed in each groove 7 of the case 6. The spring member 9 is a compression coil spring and is disposed around the outer periphery of the movement shaft 8 while being compressed between a back end 7b of the groove 7 and the bearing 22. The spring member 9 constantly biases the display unit 5 downward relative to the holder 21 (in the L2 direction), and when the display unit 5 is not subject to an external force, the front end 7a of the groove 7 abuts against the bearing 22 as shown in FIG. 3.

As shown in FIG. 2, the rotation guiding mechanism 20 includes a guiding arm 25. A pair of bearing holes 25a, 25a is formed at the proximal end of the guiding arm 25 and is rotatably supported by a first rotation center shaft O1. The first rotation center shaft O1 is a shaft which has a circular cross section and is inserted into the bearing holes 25a, 25a without a gap. Both ends of the first rotation center shaft O1 are fixed on the housing. In the drawings, however, only the center axis of the first rotation center shaft O1 is shown.

As shown in FIG. 2, connections 25b, 25b are disposed at the distal end of the guiding arm 25. Connection brackets 24, 24 are integrally formed on the back surface of the holder 21 such that each connection bracket 24 and each connection 25b of the guiding arm 25 are rotatably connected via a connection shaft 28.

In the display device 10, the guiding arm 25 on the rotation guiding mechanism 20 rotates about the first rotation center shaft O1, which causes the holder 21 to rotate about the first rotation center shaft O1. The first rotation center shaft O1 extends parallel to the display screen 12 and parallel to the front end 5a and the back end 5b of the display unit 5 at a position spaced backward from the back face 5e of the display unit 5. Accordingly, as the guiding arm 25 rotates, the display unit 5 supported by the holder 21 is rotated in an α1-α2 direction shown in FIG. 3 in an arc trajectory about the first rotation center shaft O1, and accordingly, the display screen 12 which is exposed on the front face 5d of the display unit 5 is also rotated in an arc trajectory about the first rotation center shaft O1.

Figure 4:
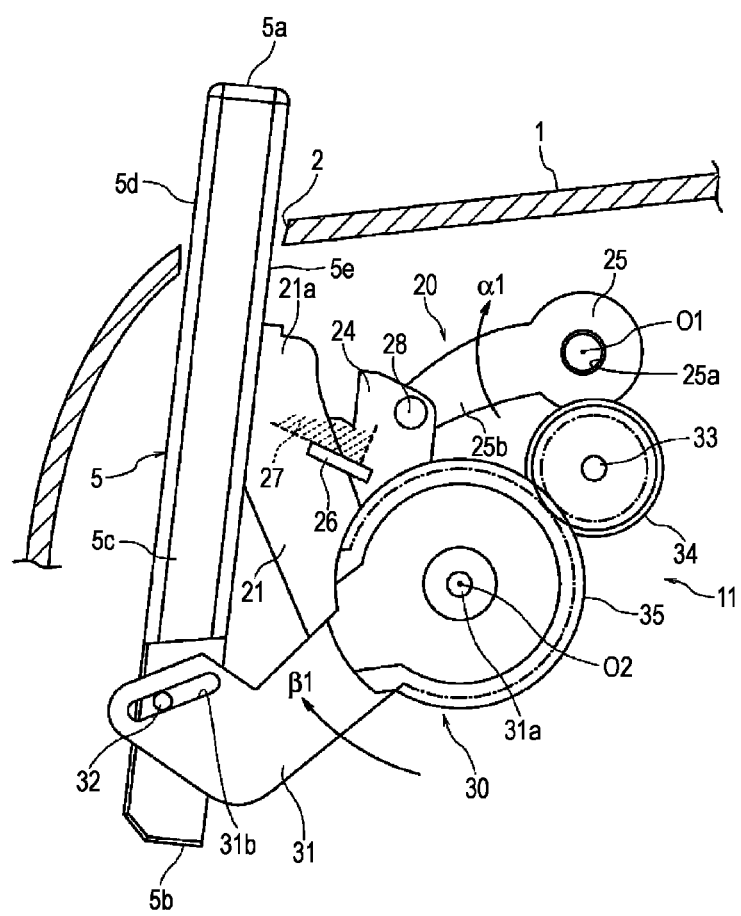
FIG. 4 is a side view which shows the display device and the cover member when a holder has been rotated to a predetermined position.

As shown in the figure such as FIG. 2, abutment sections 26, 26 are formed on both ends of the holder 21. As shown in FIG. 4, a pair of stoppers 27, 27 is formed on the housing of the display device 10 such that the abutment sections 26 and the stoppers 27 form a stopper mechanism. When the guiding arm 25 rotates in the α1 direction and the holder 21 comes to a predetermined position shown in FIG. 4, the abutment sections 26 come into contact with the stoppers 27, thereby regulating the holder 21 so as not to further rotate in the α1 direction.

As shown in FIG. 2, driving arms 31 are disposed on the right and left side ends of the movement guiding mechanism 30 of the driving mechanism 11. Fixation holes 31a are formed at the proximal end of the driving arms 31. The fixation holes 31a, 31a of a pair of driving arms 31, 31 are fixed on a second rotation center shaft O2. The second rotation center shaft O2 is a shaft which has a circular cross section, and each of the fixation holes 31a are fixed on the second rotation center shaft O2. In the drawings, however, only the center axis of the second rotation center shaft O2 is shown.

The both ends of the second rotation center shaft O2 are rotatably supported by bearings disposed on both end plates of the housing of the display device 10. Accordingly, a pair of right and left driving arms 31, 31 is rotatable in a β1-β2 direction shown in FIG. 3 while being synchronized with each other.

As shown in FIG. 2, elongated drive holes 31b are formed at the distal end of the driving arms 31, 31. Connection slide shafts 32 extend from the side ends 5c, 5c of the display unit 5 at positions close to the back end 5b and are slidably inserted in the elongated drive holes 31b, 31b.

As shown in FIG. 2, the driving mechanism 11 includes a drive shaft 33. The drive shaft 33 is rotatably supported by the bearings disposed on both end plates of the housing. Drive gears 34, 34 are disposed on the right and left ends of the drive shaft 33. The drive shaft 33 and the drive gears 34, 34 are configured to integrally rotate. Reduction gears 35 are integrally formed with the proximal end of the driving arms 31. Each reduction gear 35 has a pitch circle in a circular shape about the second rotation center shaft O2. The respective drive gears 34 mesh with the reduction gears 35.

As shown in FIG. 2, a clutch 36 is fixed on the drive shaft 33, and a transmission gear 37 is connected to the clutch 36. A power of the motor 38 which is disposed on the housing is reduced by a train of reduction gears, which is not shown in the figure, and is transmitted to the transmission gear 37. Although the drive shaft 33 is rotated by the power transmitted to the transmission gear 37, the power transmission is stopped by the clutch 36 when an excessive load is applied to the drive shaft 33. This allows the transmission gear 37 to rotate without rotating the drive shaft 33.

Next, an operation of the display device 10 will be described. FIG. 3 shows that the display unit 5 is in the initial position in which the display unit 5 is housed in the cover member 1. In FIG. 3, the drive shaft 33 is rotated by the power of the motor 38 which is disposed in the driving mechanism 11, which causes the driving arm 31 to be rotated in the β2 direction. A stopper section, which is not shown in the figure, is disposed in the housing and regulates the driving arm 31 so as not to further rotate in the β2 direction from the state shown in FIG. 3.

As shown in FIG. 3, the display unit 5 is biased by the spring member 9 in the L2 direction with respect to the holder 21, and the front end 7a of the groove 7 formed on the case 6 is brought into contact with the bearing 22. The holder 21 and the display unit 5 serve as an integral part, and accordingly, when the driving arm 31 is rotated in the β2 direction as shown in FIG. 3, the display unit 5 is pulled downward and the guiding arm 25 which is connected to the holder 21 is rotated in the α2 direction.

When the display unit 5 is in the initial position as shown in FIG. 3, the front end 5a is located under the opening 2 of the cover member 1 and the opening 2 is closed by the shield member 3.

Figure 6:
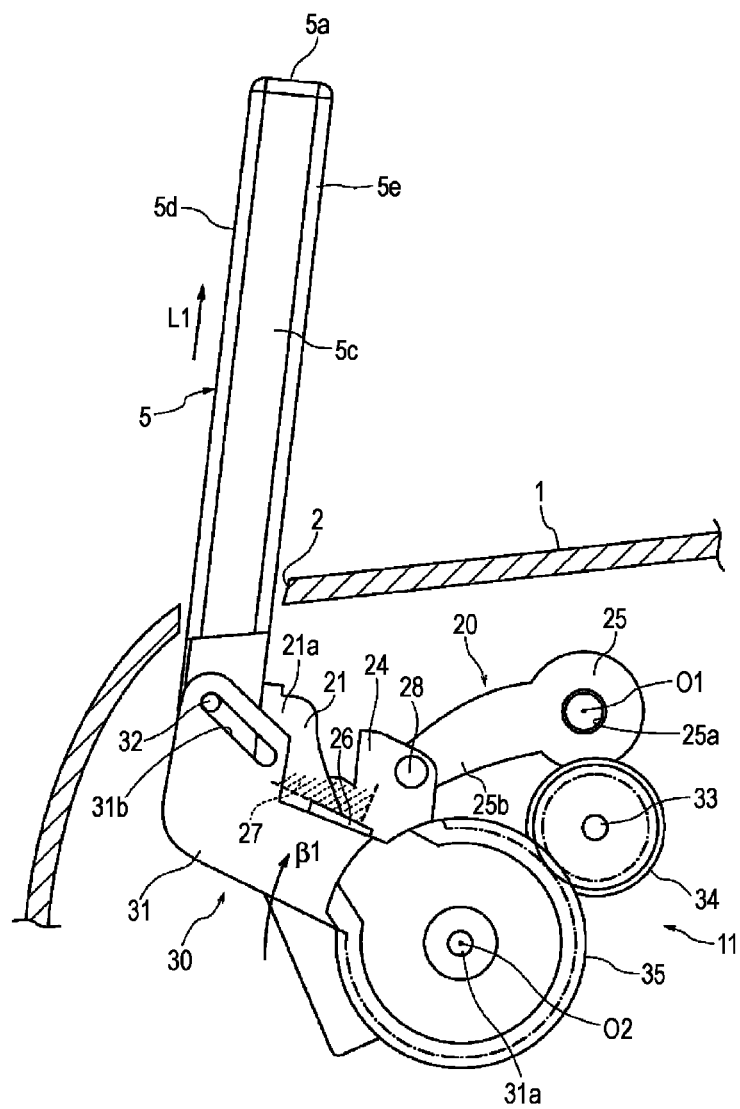
FIG. 6 is a side view which shows the display device and the cover member when display unit is in a full screen extended position.

The display unit 5 in the initial position shown in FIG. 3 is different from the display unit 5 in the extended position shown in FIG. 6 in the angular position and assumes an inclined position in which the back end 5b is located on the back side (the right side in the figure) than the front end 5a. Accordingly, a relatively large space can be ensured between the front face 5d of the display unit 5 and the cover member 1 on the left side of the FIG. 3, and various components such as air ducts for the air conditioner and audio components can be disposed in this space.

When an operation unit, which is not shown in the figure, performs an operation to extend the display unit 5 to a position in which display is possible, the motor 38 of the driving mechanism 11 is actuated, and accordingly, the shield member 3 is moved to open the opening 2.

The power of the motor 38 is transmitted to the transmission gear 37 shown in FIGS. 1 and 2 and causes the drive shaft 33 to rotate via the clutch 36. The rotation force of the drive shaft 33 is transmitted from the drive gears 34 to the reduction gears 35 and causes the right and left driving arms 31, 31 to be synchronized and rotate in the β1 direction. As the driving arms 31, 31 rotate in the β1 direction, the display unit 5 and the holder 21 are rotated. As the holder 21 rotates, the guiding arm 25 is rotated in the α1 direction.

When the holder 21 rotating in the α1 direction comes to a position shown in FIG. 4, the abutment sections 26 on the holder 21 come into contact with the stoppers 27, thereby preventing the guiding arm 25 and the holder 21 from further rotating in the α1 direction.

As shown in FIG. 4, when the holder 21 comes to a predetermined position, part of the display unit 5 which includes the front end 5a extends to the outside through the opening 2 of the cover member 1.

Even after the holder 21 comes to a predetermined position shown in FIG. 4 and stops rotating, the motor 38 continues to operate, thereby causing the driving arms 31 to be continuously rotated in the β1 direction. The rotation force of the driving arms 31 in the β1 direction causes the movement shafts 8 fixed on the case 6 to slide the bearings 22 disposed on the holder. This causes the display unit 5 to move in a linear trajectory in the L1 direction with respect to the holder 21.

Figure 5:
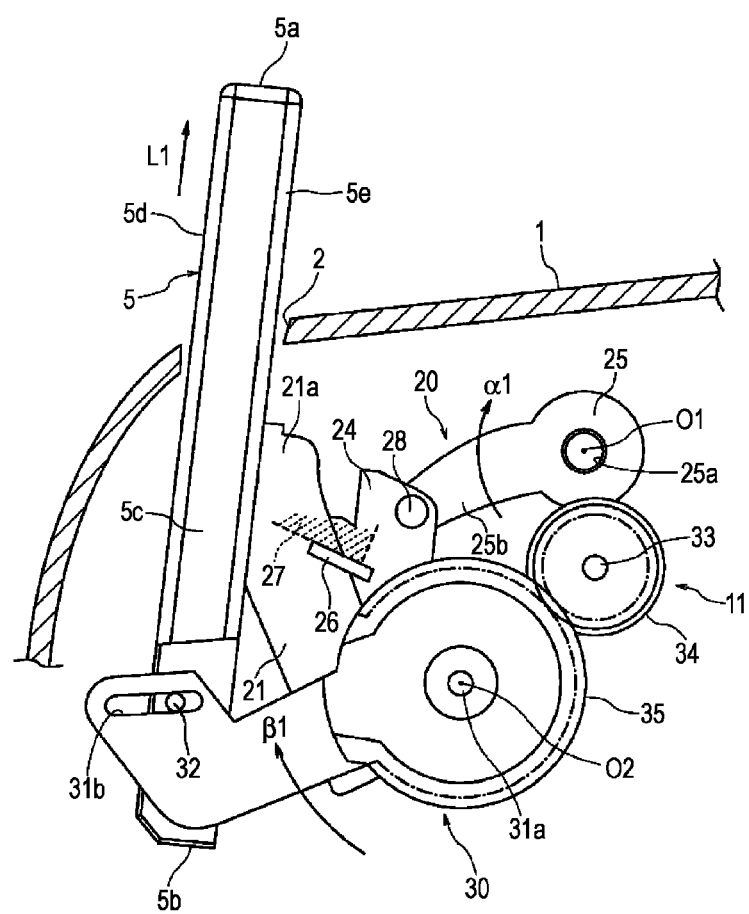
FIG. 5 is a side view which shows the display device and the cover member when the display unit has moved relative to the holder in a linear trajectory and is in a partial screen extended position.

As a result, as shown in FIG. 5, the display unit 5 moves upward in the L1 direction passing through the opening 2. The display unit 5 is in the full screen extended position in which the entire display screen 12 is located outside the cover member 1 as shown in FIG. 6. Then, the motor 38 stops operating.

As described above, when the motor 38 starts operating in the state that the display unit 5 is in the initial position shown in FIG. 3, the holder 21 rotates in the α1 direction in an arc trajectory about the first rotation center shaft O1. After the holder 21 has rotated to a predetermined position and is stopped by the stoppers 27 as shown in FIG. 4, the display unit 5 moves in the L1 direction in a linear trajectory which is a tangent to the arc trajectory of the rotation trajectory of the holder 21. As a result, the display unit 5 moves to the outside of the cover member 1 through the opening 2.

In the course of transition from the state shown in FIG. 3 to the state shown in FIG. 4, the display unit 5 passes through the opening 2 while the angular position being slightly changed. On the other hand, in the course of transition from the state shown in FIG. 4 to the state of the full screen extended position shown in FIG. 6, the display unit 5 does not come into contact with the edge of the opening 2 since the display unit 5 moves in L1 direction in a linear trajectory which is parallel to the display screen 12. The display unit 5 slightly changes or hardly changes the angular position when passing through the opening 2. Accordingly, the display unit 5 can pass through the opening 2 even if the opening 2 has a minimum opening area, which allows for minimizing the gap between the display unit 5 and the opening 2 when the display unit 5 passes through the opening 2.

The display unit 5 does not change the orientation (the inclined angle) of the display screen 12 in the course of transition from the state shown in FIG. 4 to the partial screen extended position in which part of the display screen 12 is located outside of the cover member 1 as shown in FIG. 5, and then to the full screen extended position shown in FIG. 6. Accordingly, the display screen 12 is easily viewable regardless of whether the display unit 5 is in the partial screen extended position or in the full screen extended position.

For example, it is possible to stop the motor 38 when the display unit 5 is in the partial screen extended position shown in FIG. 5 and display small images such as text information or icons on an area on the side of the front end 5a of the display screen 12. Further, in the full screen extended position shown in FIG. 6, it is possible to display images such as a map image of the navigation system and a received television image on a wide area of the screen. Accordingly, the size of the screen used for display can be changed depending of the amount of information to be shown since images can be displayed on the display screen 12 both in the full screen extended position and the partial screen extended position.

Further, as shown in FIG. 4, the motor 38 can be stopped when the holder 21 comes into contact with the stoppers 27 so that the display unit 5 is held in the state in which the display unit 5 partially extends to the outside of the cover member 1 through the opening 2. This state of the display unit 5 can serve as the partial screen extended position and images such as text information may be displayed on an area on the side of the front end 5a of the display screen 12 which extends from the cover member 1.

In this invention, when the holder 21 has rotated to a predetermined position in which the holder 21 comes into contact with the stopper 27 as shown in FIG. 4, the front end 5a of the display unit 5 may be located under the opening 2, or alternatively, the front end 5a may be in the opening 2 and substantially flush with the cover 1.

Further, the motor 38 can be stopped at positions of a plurality of phases in which different amounts of area of the display screen 12 extend from the cover member 1 in the course of transition to the full screen extended position shown in FIG. 6 so that the partial screen extended positions having different amounts of display area of display screen 12 can be set at a plurality of phases.

When the display unit 5 is housed, the driving arms 31 are rotated in the β2 direction by the motor 38.

The spring member 9 shown in FIG. 3 is compressed in the partial screen extended position shown in FIG. 5 and in the full screen extended position shown in FIG. 6, and the bearing 22 is constantly biased upward in the case 6 by the spring member 9. Accordingly, when the driving arm 31 rotates in the β2 direction, the display unit 5 moves downward in the L2 direction while the holder 21 remains in a predetermined position shown in FIG. 4. Once the display unit 5 moves downward to a position shown in FIG. 4, the guiding arm 25 that supports the holder 21 rotates in the α2 direction with the rotation of the driving arm 31 in the β2 direction, and returns to the initial position shown in FIG. 3.

Although preferred embodiments have been described in detail, the present invention is not limited to these specific embodiments of the present invention. Rather, various modifications and changes can be made without departing from the scope of the present invention as described in the accompanying claims. Accordingly, all such modifications are intended to be included within the scope of this invention as defined in the following claims.

What is claimed is:

1. A display device comprising:
a display unit having a display screen on a front side;
a driving mechanism configured to move the display unit;
a holder configured to support the display unit and reciprocally move the display unit relative to the holder in a linear trajectory parallel to the display screen;
a rotation guiding mechanism in the driving mechanism configured to rotate the holder; and
a movement guiding mechanism in the driving mechanism configured to move the display unit relative to the holder after the holder is rotated to a predetermined position.

2. The display device according to claim 1, wherein the holder is rotated by the rotation guiding mechanism about a first rotation center shaft located on a back side of the display unit, and extends parallel to the display screen, and the display unit is moved by the movement guiding mechanism in a linear trajectory tangent to a circular trajectory in which the holder rotates.

3. The display device according to claim 2, wherein the movement guiding mechanism includes a driving arm that rotates about a second rotation drive shaft which extends parallel to the first rotation center shaft, and a distal end of the driving arm is movably connected relative to the display unit, and after the holder is rotated to stop at a predetermined position, the display unit is moved with respect to the holder by a rotation force of the driving arm.

4. The display device according to claim 3, wherein the rotation force is applied from a motor to the driving arm, and the holder is rotated to a predetermined position by the rotation force of the driving arm, and the display unit is moved relative to the holder by a rotation force of the driving arm.

5. The display device according to claim 4, wherein a stopper mechanism is provided to stop the holder at a predetermined position.

6. The display device according to claim 4, wherein the display unit is biased by a spring member to be retracted to the initial position with respect to the holder.

7. The display device according to claim 1, wherein the display unit in an initial position is retracted inside a cover member, and when the holder is rotated by the rotation guiding mechanism to stop at a predetermined position, a front end which is oriented in a movement direction of the display unit, faces an opening which is formed on the cover member from an inside of the opening or the front end is located in the opening, and after rotation of the guiding mechanism, the display unit is moved by the movement guiding mechanism so as to extend to an outside of the cover member through the opening.

8. The display device according to claim 7, wherein the display unit is configured to stop in a partial screen extended position in which the display screen partially extends to the outside of the cover member, and configured to stop in a full screen extended position in which the entire display screen extends to the outside of the cover member by the movement guiding mechanism.

9. The display device according to claim 8, wherein the partial screen extended position is set at a plurality of incremental phases so that different amounts of area of the display screen extend from the cover member at each of the phases.

10. The display device according to claim 1, wherein the display unit in an initial position is retracted inside a cover member, and when the holder is rotated by the rotation guiding mechanism to stop at a predetermined position, the display unit partially extends through the opening formed on the cover member, and the display unit is moved by the movement guiding mechanism so as to extend outside of the cover member through the opening.

11. The display device according to claim 10, wherein, when the holder is rotated by the rotation guiding mechanism to stop at a predetermined position and the display unit partially extends through the opening, the partial screen extended position is set in which the display screen partially extends outside of the cover member.

12. The display device according to claim 11, wherein the display unit is configured to stop in a partial screen extended position in which the display screen partially extends outside of the cover member and in a full screen extended position in which the entire display screen extends outside of the cover member by the movement guiding mechanism.

13. The display device according to claim 12, wherein the partial screen extended position is set at a plurality of phases so that different amounts of area of the display screen extend from the cover member at each of the phases.

14. A display device comprising:
a display unit having a display screen on a front side;
a driving mechanism configured to move the display unit;
a holder configured to support the display unit and reciprocally move the display unit relative to the holder in a linear trajectory parallel to the display screen;
a rotation guiding mechanism in the driving mechanism configured to rotate the holder, the rotation guiding mechanism configured to rotate the holder about a first rotation center shaft disposed on a back side of the display unit; and
a movement guiding mechanism in the driving mechanism configured to move the display unit relative to the holder after the holder is rotated to a predetermined position.

* * * * *